(12) United States Patent
Codilian et al.

(10) Patent No.: US 6,952,322 B1
(45) Date of Patent: Oct. 4, 2005

(54) DISK DRIVE READING SERVO SECTORS RECORDED AT A RELATIVE OFFSET ON MULTIPLE DISK SURFACES TO INCREASE THE SERVO SAMPLE RATE

(75) Inventors: Raffi Codilian, Irvine, CA (US); George J. Bennett, Murrieta, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 252 days.

(21) Appl. No.: 10/307,068

(22) Filed: Nov. 27, 2002

(51) Int. Cl.[7] ............................................. G11B 5/596
(52) U.S. Cl. ..................................... 360/77.05; 360/75
(58) Field of Search ............................... 360/75, 78.04, 360/78.05, 77.05; 318/625, 593

(56) References Cited

U.S. PATENT DOCUMENTS

| | | | |
|---|---|---|---|
| 4,722,010 A | 1/1988 | Suzuki et al. | |
| 5,452,275 A | 9/1995 | Ogawa | |
| 5,777,815 A * | 7/1998 | Kasiraj et al. | 360/75 |
| 5,852,524 A | 12/1998 | Glover et al. | |
| 5,901,010 A | 5/1999 | Glover et al. | |
| 5,936,790 A | 8/1999 | Ho et al. | |
| 6,005,742 A | 12/1999 | Cunningham et al. | |
| 6,069,771 A | 5/2000 | Boutaghou et al. | |
| 6,088,187 A | 7/2000 | Takaishi | |
| 6,100,623 A | 8/2000 | Huang et al. | |
| 6,160,676 A * | 12/2000 | Takaishi | 360/78.05 |
| 6,201,668 B1 | 3/2001 | Murphy | |
| 6,226,140 B1 | 5/2001 | Serrano et al. | |
| 6,266,205 B1 | 7/2001 | Schreck et al. | |
| 6,292,320 B1 | 9/2001 | Mason et al. | |
| 6,370,039 B1 | 4/2002 | Telefus | |
| 6,483,659 B1 * | 11/2002 | Kobayashi et al. | 360/78.04 |
| 6,590,734 B1 | 7/2003 | Ell | |
| 6,671,120 B2 * | 12/2003 | Koganezawa et al. | 360/78.05 |
| 6,741,417 B2 * | 5/2004 | Hsin et al. | 360/78.05 |

* cited by examiner

*Primary Examiner*—K. Wong
(74) *Attorney, Agent, or Firm*—Howard H. Sheerin, Esq.

(57) ABSTRACT

A disk drive is disclosed comprising a first disk surface and a second disk surface, wherein a first head is actuated radially over the first disk surface and a second head is actuated radially over the second disk surface. Each disk surface comprises a plurality of tracks, wherein each track comprises a plurality of data sectors for storing user data and N embedded servo sectors for storing servo data. The N embedded servo sectors on the tracks on the first disk surface are recorded at a physical angular offset from the N embedded servo sectors on the tracks on the second disk surface. While accessing a track on the first disk surface through the first head, the servo data on the first disk surface is read through the first head and the servo data on the second disk surface is read through the second head, thereby increasing the servo sample rate.

32 Claims, 10 Drawing Sheets

DISK DRIVE READING SERVO SECTORS RECORDED AT A RELATIVE OFFSET ON MULTIPLE DISK SURFACES TO INCREASE THE SERVO SAMPLE RATE

CROSS REFERENCE TO RELATED APPLICATIONS AND PATENTS

This application is related to co-pending U.S. patent application Ser. No. 09/945,404 entitled "DISK DRIVE COMPRISING AN INTEGRATOR FOR CONTROLLING A VCM ACTUATOR AND TRANSFORMER FOR CONTROLLING A PIEZOELECTRIC ACTUATOR" filed on Aug. 31, 2001 the disclosure of which is incorporated herein by reference.

BACKGROUND OF THE INVENTION

1. Field of the Invention

The present invention relates to disk drives. More particularly, the present invention relates to a disk drive reading servo sectors (also known as "servo wedges") in an interleaved fashion recorded at a relative offset on multiple disk surfaces to increase the servo sample rate.

2. Description of the Prior Art

The servo sample rate (frequency of sampled servo sectors) affects various aspects of a disk drive, including track misregistration (TMR), servo bandwidth, shock detection, and radial recording density or tracks-per-inch (TPI). Increasing the number of servo sectors per disk surface increases the servo sample rate but decreases capacity due to the overhead required to record each servo sector.

U.S. Pat. No. 5,936,790 discloses a disk drive which increases the servo sample rate by reading servo sectors from multiple disk surfaces while accessing a selected disk surface. One of the disk surfaces, referred to as the "master", comprises significantly more servo sectors than the other disk surfaces, referred to as the "slaves". While the disk drive is accessing a slave disk surface during a read/write command, the servo sectors recorded on the master disk surface are read and used to augment the servo data read from the servo sectors recorded on the slave disk surface. Although this technique increases the servo sample rate, the capacity of the master disk surface is reduced due to the increased number of servo sectors.

There is, therefore, a need to increase the servo sample rate in a disk drive without decreasing the capacity of any one of the disk surfaces.

SUMMARY OF THE INVENTION

The present invention may be regarded as a disk drive comprising a first disk surface and a second disk surface, wherein a first head is actuated radially over the first disk surface and a second head is actuated radially over the second disk surface. Each disk surface comprises a plurality of tracks. A first track on the first disk surface comprises a plurality of data sectors for storing user data and N embedded servo sectors for storing servo data, and a second track on the second disk surface comprises a plurality of data sectors for storing user data and N embedded servo sectors for storing servo data. The N embedded servo sectors are recorded at a periodic interval around the circumference of the first and second tracks. The N embedded servo sectors on the first track are recorded at a physical angular offset from the N embedded servo sectors on the second track. While accessing the first track through the first head, the servo data on the first track is read through the first head and the servo data on the second track is read through the second head.

In one embodiment, the servo data read from the second track through the second head is used to generate a shock detect signal representing a physical shock to the disk drive. In another embodiment, the servo data read from the first track through the first head is used to generate the shock detect signal. In one embodiment, the servo data read from the second track is high-pass filtered to generate the shock detect signal. In one embodiment, accessing the first track comprises writing data to the first track during a write operation, wherein the write operation is aborted if the shock detect signal indicates a physical shock of sufficient magnitude has occurred. In yet another embodiment, the write operation is aborted if the shock detect signal exceeds a predetermined threshold. In one embodiment, the servo data read from the first and second tracks is used to control the position of the first head with respect to the first track.

In yet another embodiment, the first head is coupled to a first actuator arm and the second head is coupled to a second actuator arm. A voice coil motor rotates the first and second actuator arms about a pivot axis. A first microactuator actuates the first head radially over the first disk surface in fine movements in response to the servo data read from the first track, and a second microactuator actuates the second head radially over the second disk surface in fine movements independent of the first microactuator in response to the servo data read from the second track. In one embodiment, the servo data read from the first and second tracks is used to control the voice coil motor.

In still another embodiment, a voice coil motor rotates the first and second actuator arms about a pivot axis, and a microactuator actuates the first head and the second head in fine movements in response to the servo data read from the first and second tracks.

The present invention may also be regarded as a method of operating a disk drive. The disk drive comprises a first disk surface and a second disk surface, wherein a first head is actuated radially over the first disk surface and a second head is actuated radially over the second disk surface. Each disk surface comprises a plurality of tracks. A first track on the first disk surface comprises a plurality of data sectors for storing user data and N embedded servo sectors for storing servo data. A second track on the second disk surface comprises a plurality of data sectors for storing user data and N embedded servo sectors for storing servo data. The N embedded servo sectors are recorded at a periodic interval around the circumference of the first and second tracks. The N embedded servo sectors on the first track are recorded at a physical angular offset from the N embedded servo sectors on the second track. The method comprises the steps of positioning the first head over the first track on the first disk surface, and accessing the first track through the first head. While accessing the first track through the first head, the servo data on the first track is read through the first head and the servo data on the second track is read through the second head.

DESCRIPTION OF THE PREFERRED EMBODIMENTS

Figures 1A, 1B:
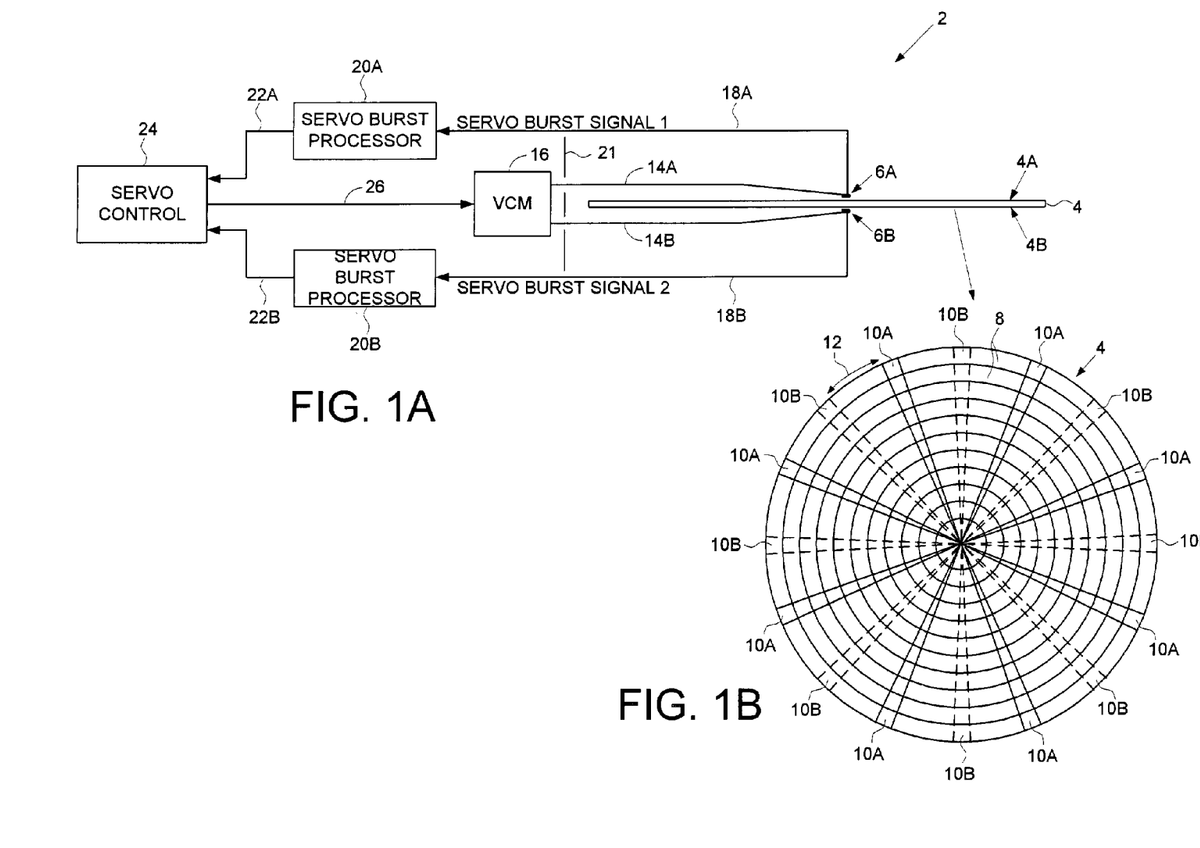
FIGS. 1A and 1B show a disk drive according to an embodiment of the present invention wherein the embedded servo sectors on a first disk surface are recorded at a physical angular offset from the embedded servo sectors on a second disk surface, wherein the embedded servo sectors are read from both disk surfaces while accessing the first disk surface in order to increase the servo sample rate.

FIG. 1A shows a disk drive 2 according to an embodiment of the present invention comprising a disk 4 having a first disk surface 4A and a second disk surface 4B, wherein a first head 6A, which is active, is actuated radially over the first disk surface 4A and a second head 6B, which is non-active, is actuated radially over the second disk surface 4B. When a head is active, it transfers user data to or from a disk surface and when a head is non-active, it reads servo information from a disk surface. Each disk surface 4A and 4B comprises a plurality of tracks 8 as shown in FIG. 1B. A first track on the first disk surface 4A comprises a plurality of data sectors for storing user data and N embedded servo sectors 10A for storing servo data, and a second track on the second disk surface 4B comprises a plurality of data sectors for storing user data and N embedded servo sectors 10B for storing servo data. The N embedded servo sectors 10A and 10B are recorded at a periodic interval around the circumference of the first and second tracks. The N embedded servo sectors 10A on the first track are recorded at a physical angular offset 12 from the N embedded servo sectors 10B on the second track. While accessing the first track through the first head 6A, the servo data on the first track is read through the first head 6A and the servo data on the second track 6B is read through the second head 6B. In one embodiment, "N" may be any suitable positive integer such as 160.

In the embodiment of FIGS. 1A and 1B, the first disk surface 4A is the top surface of the disk 4, and the second disk surface 4B is the bottom surface of the disk 4. In an alternative embodiment, the first disk surface 4A may be the top or bottom surface of a first disk, and the second disk surface 4B may be the top or bottom surface of a second disk. Also in the embodiment of FIG. 1A, the first head 6A is coupled to a first actuator arm 14A and the second head 6B is coupled to a second actuator arm 14B. A voice coil motor (VCM) 16 rotates the first and second actuator arms 14A and 14B about a pivot axis 21. When reading the N embedded servo sectors 10A on the first disk surface 4A a first servo burst signal 18A is generated, and when reading the embedded servo sectors 10B on the second disk surface 4B a second servo burst signal 18B is generated. A first servo burst processor 20A processes the first servo burst signal 18A, and a second servo burst processor 20B processes the second servo burst signal 18B. The servo burst processors 20A and 20B generate a head position signal 22A and 22B in response to servo bursts recorded at precise intervals and offsets with respect to the tracks within each servo sector. Any suitable servo burst pattern may be employed for generating the head position signals 22A and 22B. The head position signals 22A and 22B are processed by a servo controller 24 to generate a control signal 26 applied to the VCM 16.

Figure 2A:
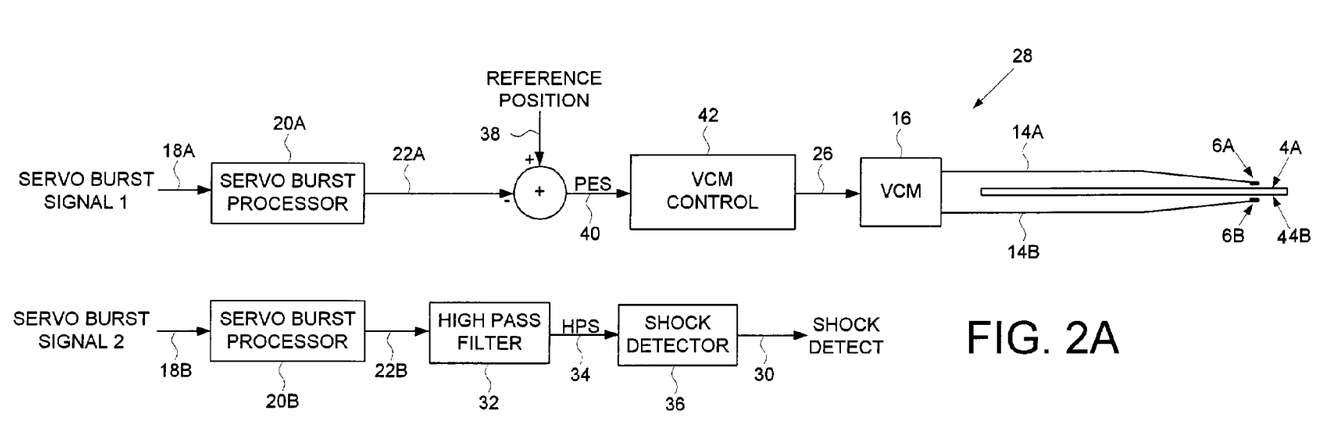
FIG. 2A shows a disk drive according to an embodiment of the present invention wherein the servo data read from the second disk surface is used to generate a shock detect signal.
Figure 2B:
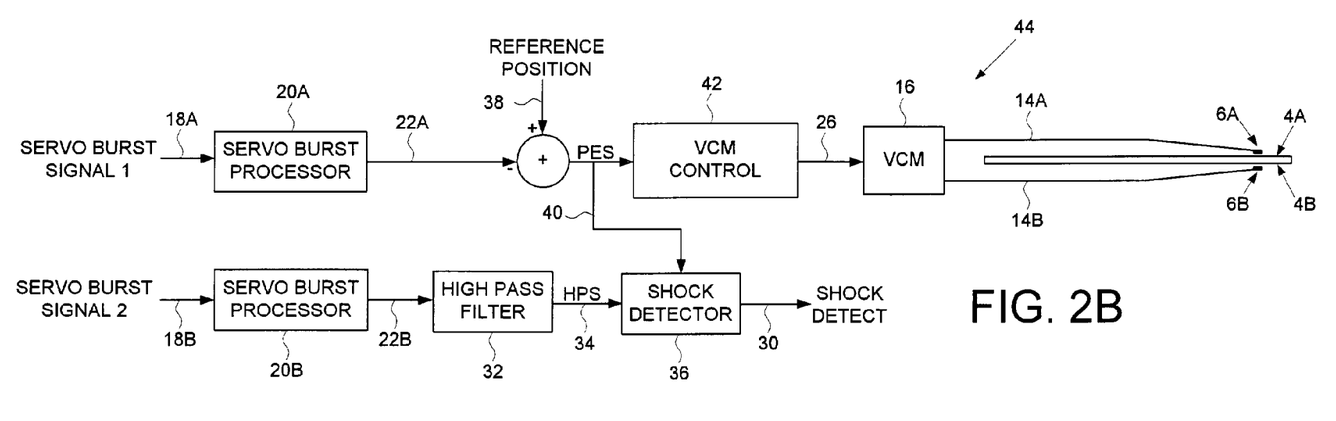
FIG. 2B shows a disk drive according to an embodiment of the present invention wherein the servo data read from both the first and second disk surface is used to generate the shock detect signal.

FIG. 2A shows a disk drive 28 according to an embodiment of the present invention wherein the head position signal 22B generated from the servo data read from the second disk surface is used to generate a shock detect signal 30 representing a physical shock to the disk drive 28. In the embodiment shown in FIG. 2A, the head position signal 22B generated from the periodic servo burst signal 18B is high-pass filtered 32 to generate a high-pass signal (HPS) 34. A shock detector 36 processes the HPS 34 to generate the shock detect signal 30. Also in the embodiment of FIG. 2A, the head position signal 22A generated from the servo burst signal 18A is subtracted from a reference position 38 to generate a position error signal (PES) 40. A VCM controller 42 processes the PES 40 to generate the control signal 26 applied to the VCM 16. FIG. 2B shows a disk drive 44 according to an embodiment of the present invention wherein the shock detector 36 processes the HPS 34 and the PES 40 to generate the shock detect signal 30.

Figure 3A:
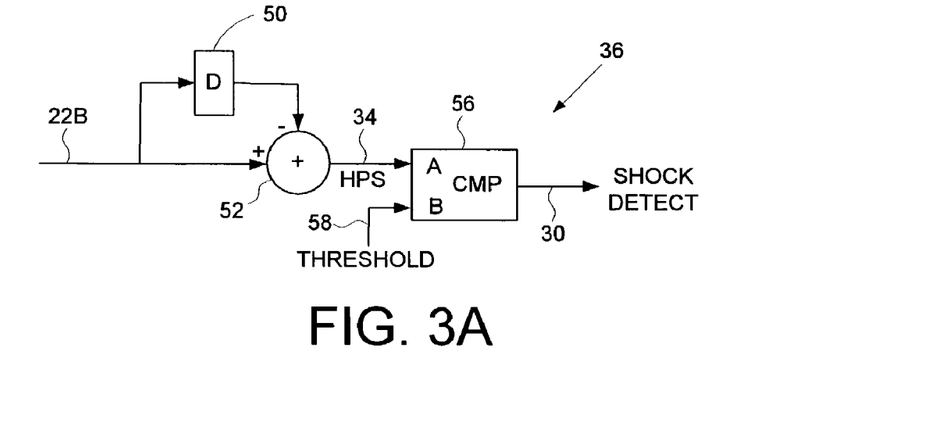
FIG. 3A shows an embodiment of a shock detector and a high pass filter wherein a subtractor generates a high-pass signal and the shock detect signal is activated if the high-pass signal exceeds a threshold.
Figure 3B:
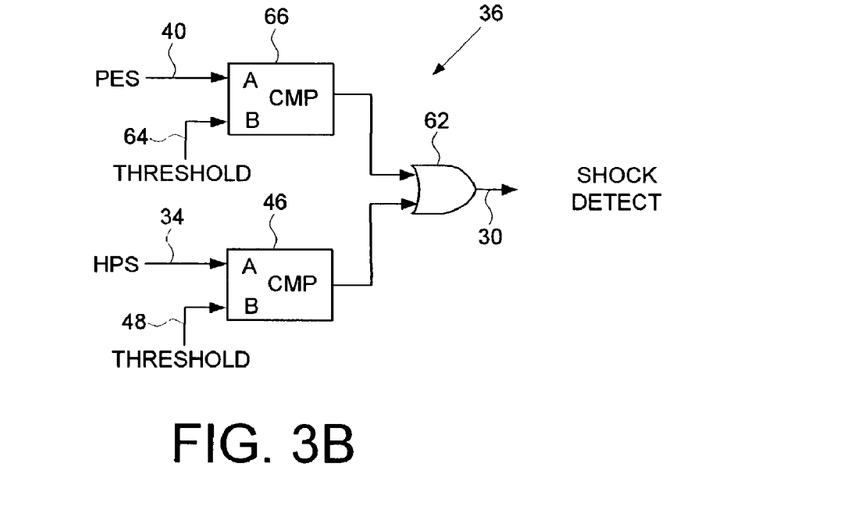
FIG. 3B shows an embodiment of a shock detector wherein the shock detect signal is activated if either the HPS exceeds a threshold or the position error signal (PES) generated from the servo data read from the first disk surface exceeds a threshold.

FIG. 3B shows an embodiment of a shock detector 36 and a high pass filter. In the embodiment shown, high pass filter includes a delay 50 and a subtractor 52. The current PES signal 22B, derived from a head which is non-active, is delayed via delay 50 for a sample period which is a delay between two consecutive servo sectors of the same track and subtracted via subtractor 52 to generate a high-pass signal 34. Shock detect signal 30 is activated at the output of comparator 56 if the high-pass signal 54 exceeds a predetermined threshold 58. FIG. 3B shows an embodiment of a shock detector 36 wherein the shock detect signal 30 is activated at the output of OR gate 62 if either the HPS 34, from a head which is non-active, exceeds the threshold 48 or the PES 40, from a head which is active, exceeds a threshold 64 at comparator 66.

In one embodiment, accessing a track on the first disk surface 4A through the first head 4A comprises writing data to the track during a write operation or reading data from the track during a read operation. In one embodiment, the write operation is aborted if the shock detect signal 30 indicates a physical shock of sufficient magnitude has occurred. Reading the embedded servo sectors 10A and 10B from the first and second disk surfaces 4A and 4B in an alternating sequence increases the servo sample rate, thereby improving performance of various drive operations such as shock detect.

Figure 4:
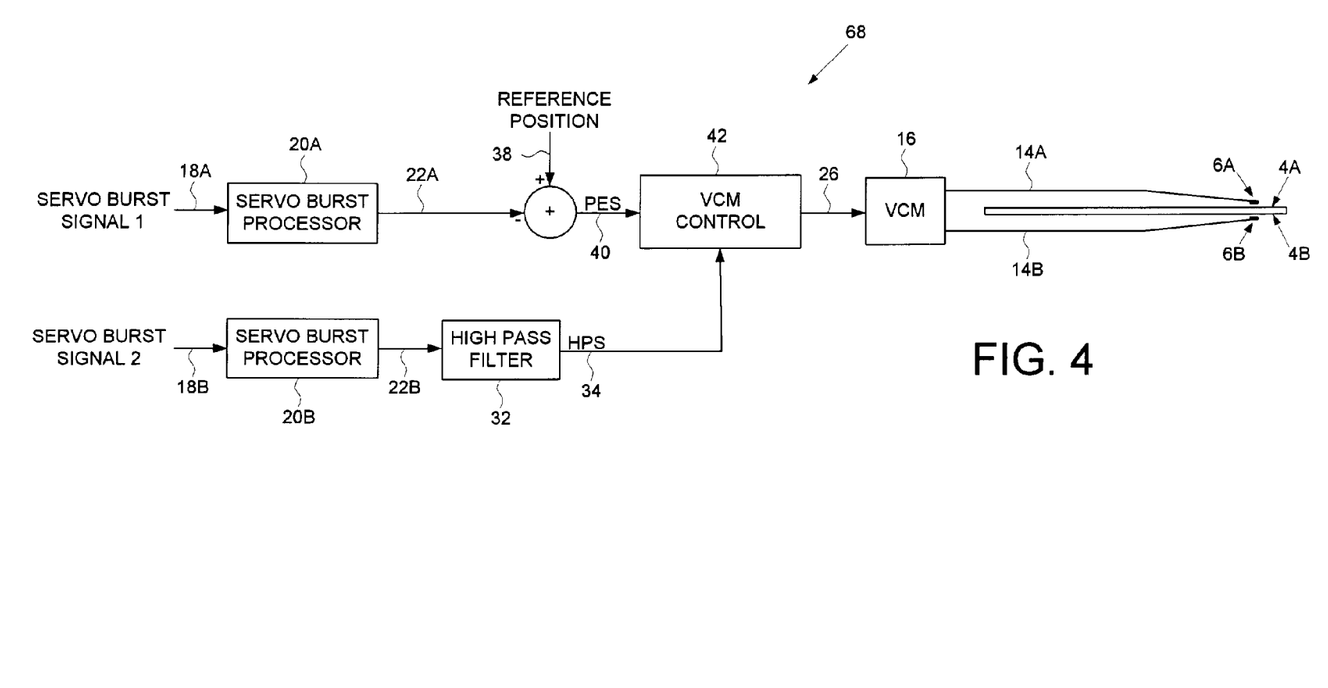
FIG. 4 shows a disk drive according to an embodiment of the present invention wherein the servo data read from the first and second disk surfaces is used to control the position of the first head.

FIG. 4 shows a disk drive 68 according to an embodiment of the present invention wherein the servo data read from the first and second disk surfaces 4A and 4B is used to control the voice coil motor 16. In the embodiment of FIG. 4, the PES 40 generated from the first servo burst signal 18A and the HPS 34 generated from the second servo burst signal 18B are processed by the VCM controller 42 to generate the control signal 26 applied to the VCM 16. Any suitable control algorithm may be implemented by the VCM controller 42.

Figures 5A, 5B:
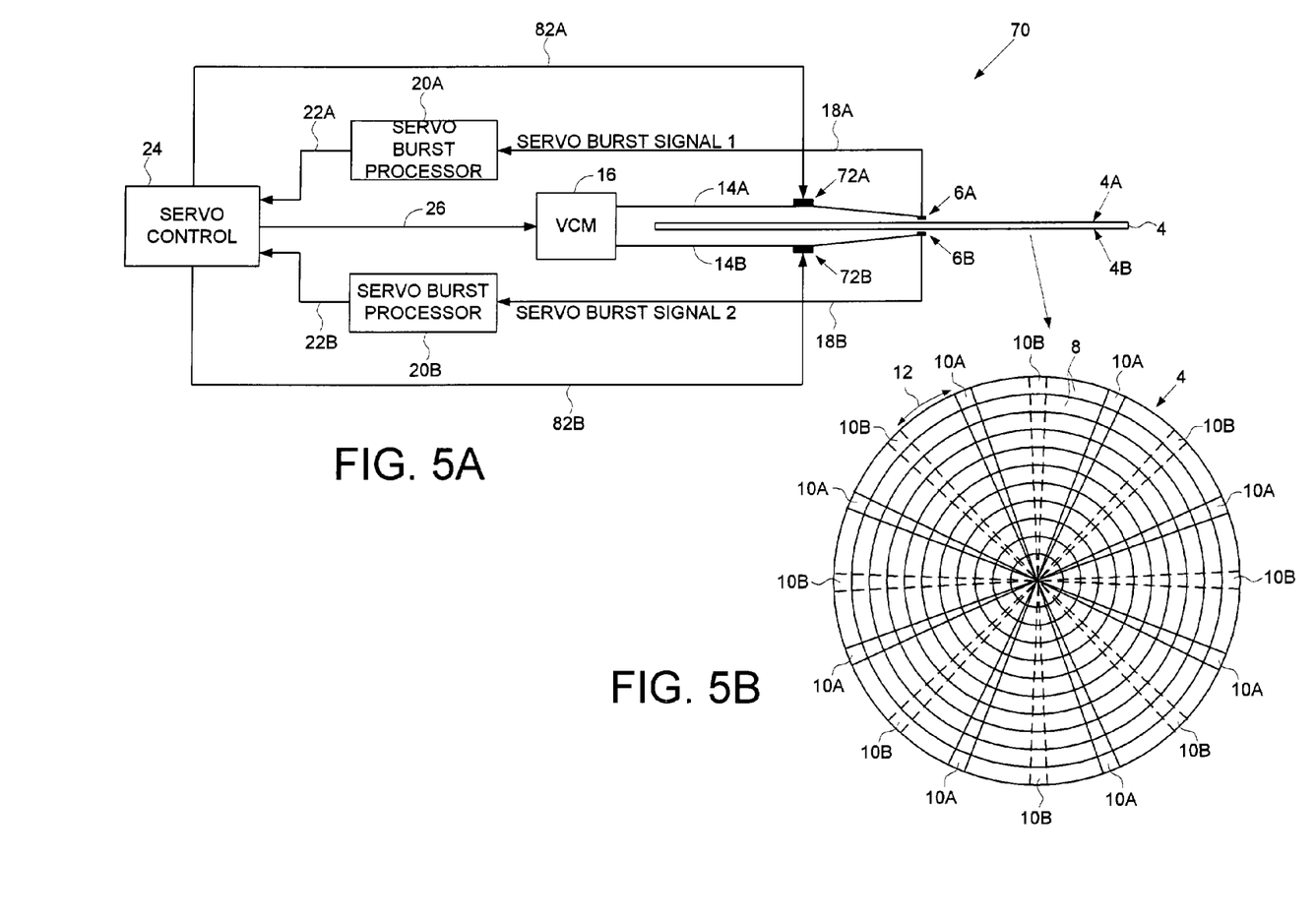
FIGS. 5A and 5B show a disk drive according to an embodiment of the present invention wherein a voice coil motor (VCM) provides coarse position and first and second microactuators provide fine positioning of the first and second heads.

FIGS. 5A and 5B show a disk drive 70 according to an embodiment of the present invention wherein a first microactuator 72A actuates the first head 6A radially over the first disk surface 4A in fine movements in response to the servo data read from the first disk surface 4A. A second microactuator 72B actuates the second head 6B radially over the second disk surface 4B in fine movements independent of the first microactuator 72A in response to the servo data read from the second disk surface 4B. Any suitable microactuator may be employed in the embodiments of the present invention, including any suitable piezoelectric microactuator. The servo controller 24 generates a first control signal 82A for controlling the first microactuator 72A and a second control signal 82B for controlling the second microactuator 72B.

Figure 6:
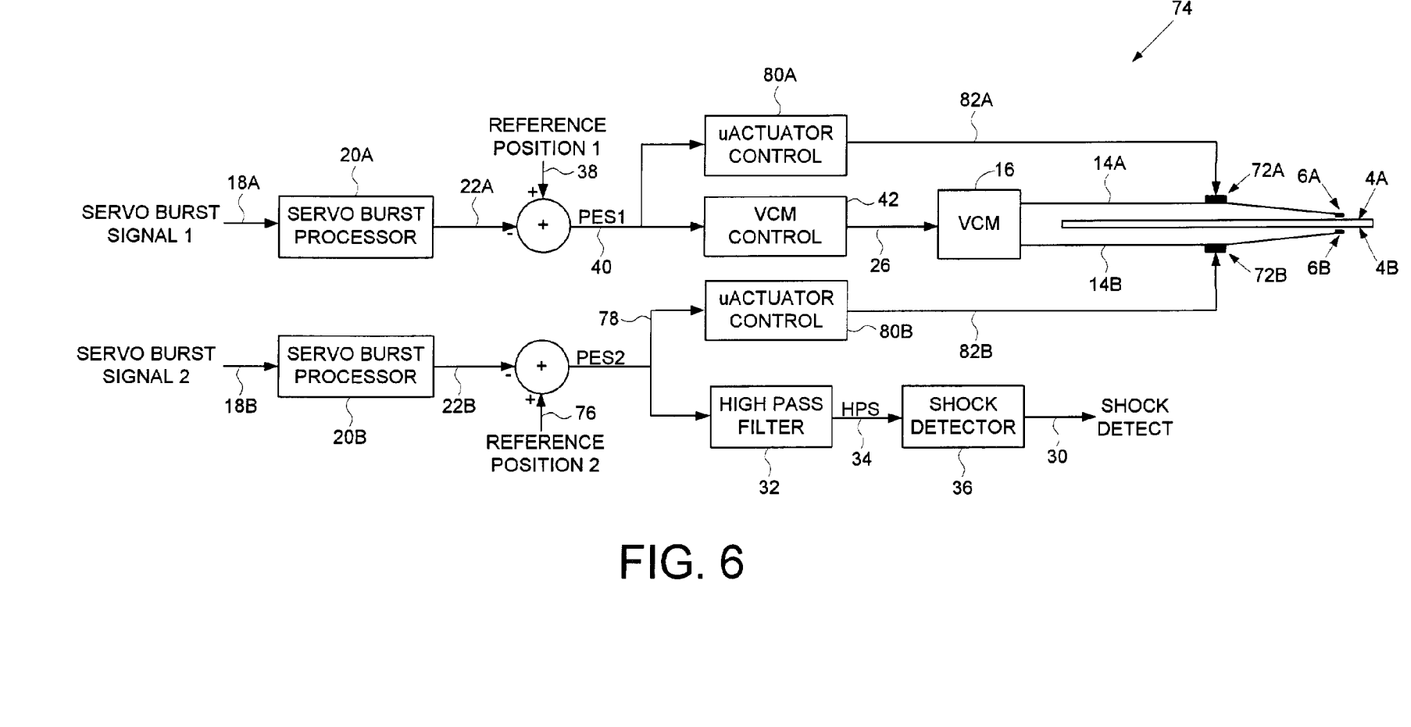
FIG. 6 shows a disk drive according to an embodiment of the present invention wherein first and second microactuators are used to control the position of the first and second heads independently, and the servo data read from the second disk surface is used to generate the shock detect signal.

FIG. 6 shows a disk drive 74 according to an embodiment of the present invention wherein the head position signal 22B is subtracted from a second reference position 76 to generate a second PES 78. The first PES 40 is applied to the VCM controller 42 for generating the control signal 26 applied to the VCM 16 and to a first microactuator controller 80A for generating the control signal 82A applied to the first microactuator 72A. The second PES 78 is applied to a second microactuator controller 80B for generating the control signal 82B applied to the second microactuator 72B. The second PES 78 is also high-pass filtered 32 to generate the HPS 34 applied to the shock detector 36 for generating the shock detect signal 30.

Figure 7:
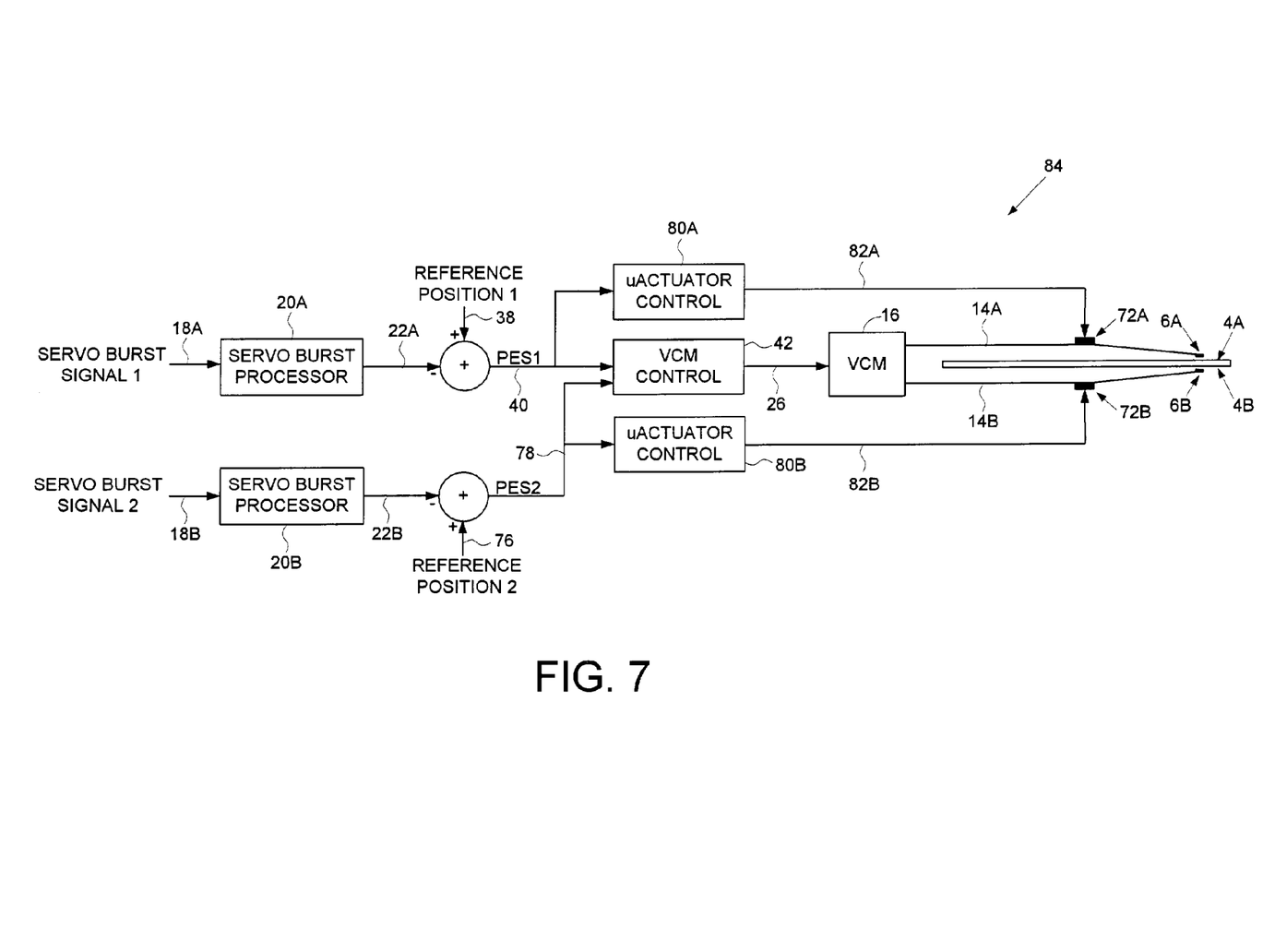
FIG. 7 shows a disk drive according to an embodiment of the present invention wherein the servo data read from the first and second disk surfaces is used to control the voice coil motor as well as the respective first and second microactuators.

FIG. 7 shows a disk drive 84 according to an embodiment of the present invention wherein the first PES 40 and the second PES 78 are applied to the VCM controller 42 for generating the control signal 26 applied to the VCM 16. In this embodiment, both heads can be active.

Figure 8:
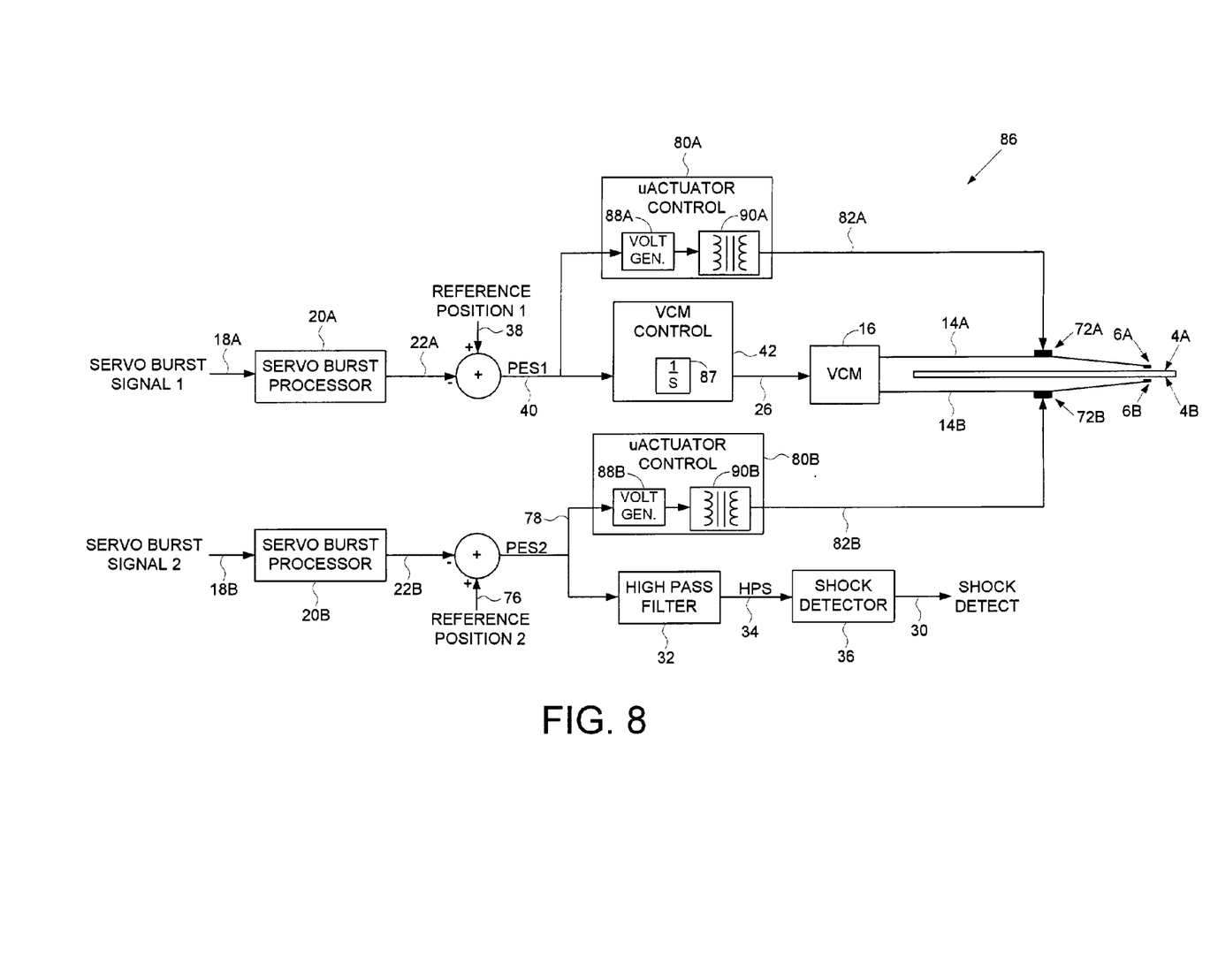
FIG. 8 shows a disk drive according to an embodiment of the present invention wherein an integrator is used to generate the VCM control signal, and a voltage generator and a transformer are used to generate the microactuator control signals.

FIG. 8 shows a disk drive 86 according to an embodiment of the present invention wherein the VCM controller 42 comprises an integrator 87 for integrating the first PES 40 to generate the control signal 26 applied to the VCM 16. The first and second microactuator controllers 80A and 80B comprise a voltage generator 88A and 88B and a transformer 90A and 90B for generating the control signals 82A and 82B applied to the microactuators 72A and 72B. Further details of this embodiment are disclosed in the above-referenced U.S. patent application entitled "DISK DRIVE COMPRISING AN INTEGRATOR FOR CONTROLLING A VCM ACTUATOR AND TRANSFORMER FOR CONTROLLING A PIEZOELECTRIC ACTUATOR".

Figure 9A:
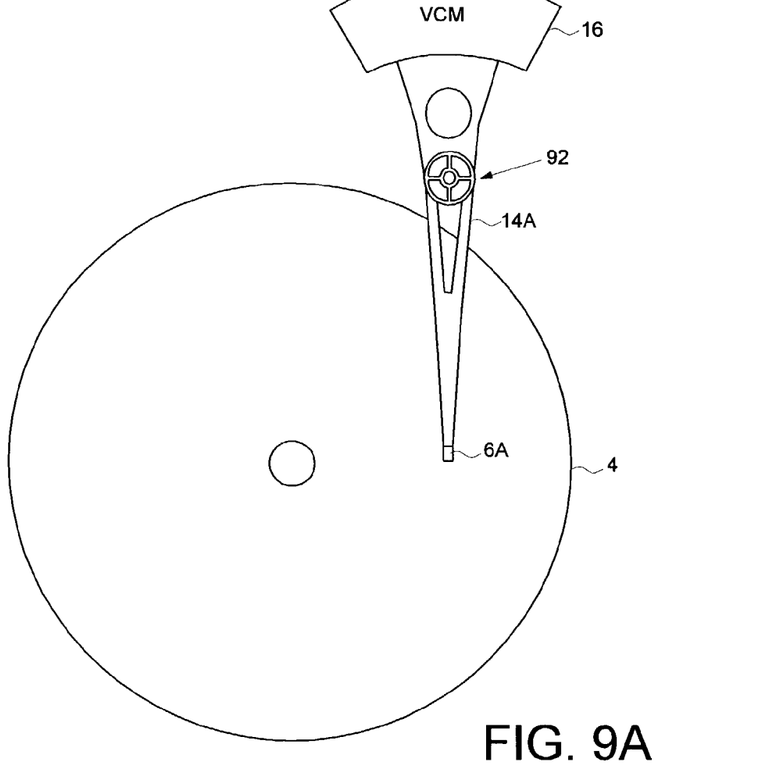
FIGS. 9A and 9B show an embodiment of the present invention wherein a microactuator actuates both the first and second heads in fine movements.
Figure 9B:
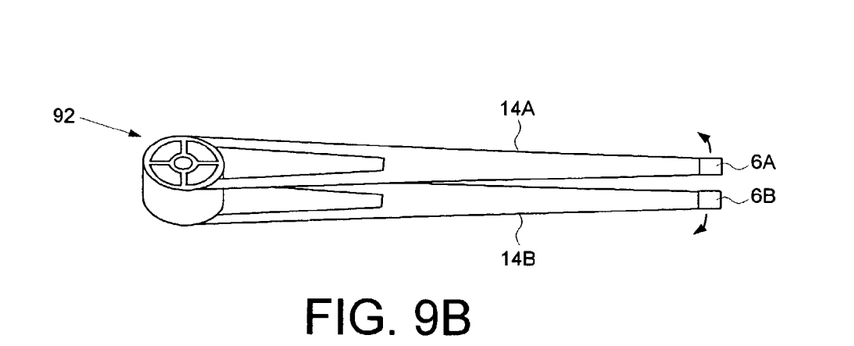

FIGS. 9A and 9B shows an embodiment of the present invention wherein a microactuator 92 actuates the first head 6A radially over the first disk surface 4A and the second head 6B radially over the second disk surface 4B in fine movements in response to the servo data read from the first and second disk surfaces 4A and 4B. In one embodiment the microactuator 92 comprises a ceramic capacitor which morphs (bends) proportional to the magnitude and polarity of an applied voltage causing the actuator arms 14A and 14B to split apart or close together in a scissor motion about a midpoint. The midpoint about which the microactuator 92 operates is controlled by the VCM 16. Although the microactuator 92 actuates the first and second heads 6A and 6B in a dependent manner, the mathematical result when combined with the VCM controls the position of the first and second heads 6A and 6B independently.

Figure 10:
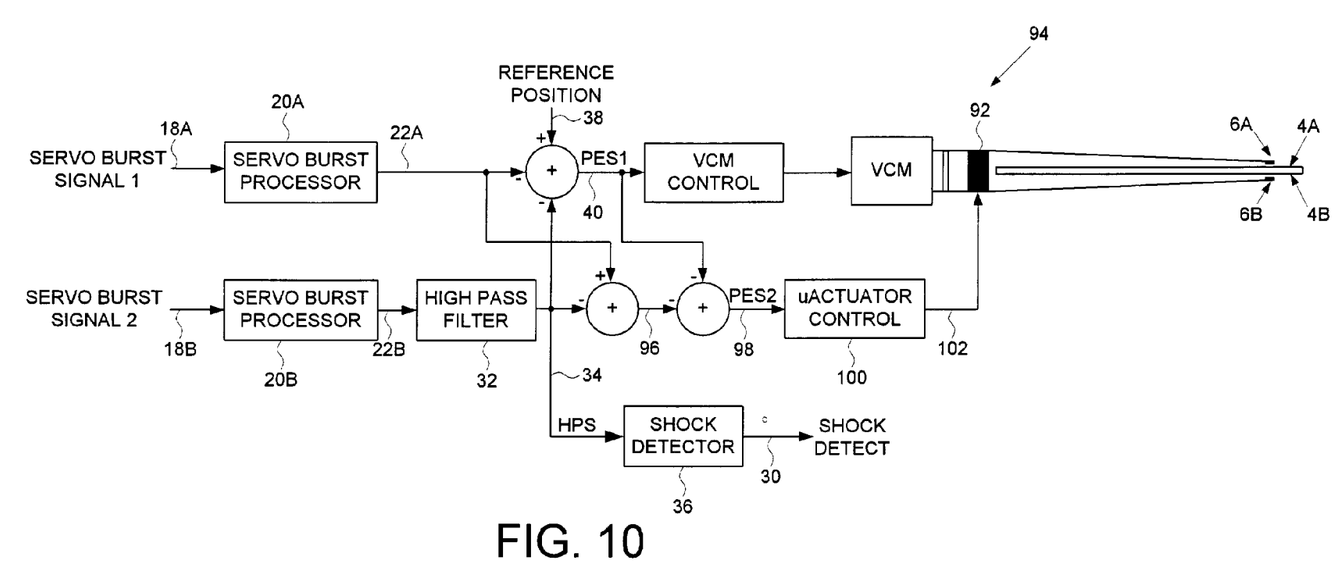
FIG. 10 shows a disk drive according to an embodiment of the present invention wherein the HPS and PES generate control signals for controlling the VCM and the microactuator of FIG. 9B.

FIG. 10 shows a disk drive 94 according to an embodiment of the present invention wherein the HPS 34 is subtracted from the reference position 38 to generate the PES 40 applied to the VCM controller 42. The HPS 34 is also subtracted from the head position signal 22A to generate a difference signal 96. The negative of the difference signal 96 is added to the negative of the PES 40 to generate a PES 98 applied to a microactuator controller 100 for applying an appropriate control signal 102 to the microactuator 92. The HPS 34 is also used to generate the shock detect signal 30 as described above.

We claim:

1. A disk drive comprising:
   (a) a first disk surface and a second disk surface;
   (b) a first head coupled to a first actuator arm and a second head coupled to a second actuator arm and;
   (c) a voice coil motor for rotating the first and second actuator arms about a pivot axis, wherein:
   each disk surface comprises a plurality of tracks;
   a first track on the first disk surface comprises a plurality of data sectors for storing user data and N embedded servo sectors for storing servo data;
   a second track on the second disk surface comprises a plurality of data sectors for storing user data and N embedded servo sectors for storing servo data;
   the N embedded servo sectors are recorded at a periodic interval around a circumference of the first and second tracks;
   the N embedded servo sectors on the first track are recorded at a physical angular offset from the N embedded servo sectors on the second track; and
   while accessing the first track through the first head, the servo data on the first track is read through the first head and the servo data on the second track is read through the second head, wherein the servo data read from the second track is high pass filtered to generate a high pass signal for controlling the voice coil motor to actuate the first head over the first disk surface.

2. The disk drive as recited in claim 1, wherein the servo data read from the second track through the second head is used to generate a shock detect signal representing a physical shock to the disk drive.

3. The disk drive as recited in claim 2, wherein the servo data read from the first track through the first head is used to generate the shock detect signal.

4. The disk drive as recited in claim 2, wherein the shock detect signal is generated in response to the high pass signal.

5. The disk drive as recited in claim 3, wherein the shock detect signal is generated in response to the high pass signal.

6. The disk drive as recited in claim 2, wherein:
   (a) accessing the first track comprises writing data to the first track during a write operation; and
   (b) the write operation is aborted if the shock detect signal indicates a physical shock of sufficient magnitude has occurred.

7. The disk drive as recited in claim 6, wherein the write operation is aborted if the shock detect signal exceeds a predetermined threshold.

8. The disk drive as recited in claim 6, wherein the write operation is aborted if the high-pass signal exceeds a predetermined threshold.

9. The disk drive as recited in claim 3, wherein:
(a) accessing the first track comprises writing data to the first track during a write operation; and
(b) the write operation is aborted if the shock detect signal indicates a physical shock of sufficient magnitude has occurred.

10. The disk drive as recited in claim 9, wherein the write operation is aborted if the shock detect signal exceeds a predetermined threshold.

11. The disk drive as recited in claim 9, wherein the write operation is aborted if the high-pass signal exceeds a predetermined threshold.

12. The disk drive as recited in claim 1, wherein the servo data read from the first and second tracks is used to control the position of the first head with respect to the first track.

13. The disk drive as recited in claim 1, the disk drive further comprising:
(a) a first microactuator for actuating the first head radially over the first disk surface in fine movements in response to the servo data read from the first track; and
(b) a second microactuator for actuating the second head radially over the second disk surface in fine movements independent of the first microactuator in response to the servo data read from the second track.

14. The disk drive as recited in claim 13, wherein the servo data read from the first track is used to control the voice coil motor.

15. The disk drive as recited in claim 13, wherein the servo data read from the first and second tracks is used to control the voice coil motor.

16. The disk drive as recited in claim 1, the disk drive further comprising
a microactuator for actuating the first head radially over the first disk surface and the second head radially over the second disk surface in fine movements in response to the servo data read from the first and second tracks.

17. A method of operating a disk drive, the disk drive comprising a first disk surface and a second disk surface, a first head coupled to a first actuator arm, a second head coupled to a second actuator arm, and a voice coil motor for rotating the first and second actuator arms about a pivot axis, wherein each disk surface comprises a plurality of tracks, a first track on the first disk surface comprises a plurality of data sectors for storing user data and N embedded servo sectors for storing servo data, a second track on the second disk surface comprises a plurality of data sectors for storing user data and N embedded servo sectors for storing servo data, the N embedded servo sectors are recorded at a periodic interval around a circumference of the first and second tracks, wherein the N embedded servo sectors on the first track are recorded at a physical angular offset from the N embedded servo sectors on the second track, the method comprising the steps of:
(a) positioning the first head over the first track on the first disk surface;
(b) accessing the first track through the first head; and
(c) while accessing the first track through the first head;
reading the servo data on the first track through the first head and reading the servo data on the second track through the second head; and
filtering the servo data read from the second track to generate a high pass signal for controlling the voice coil motor to actuate the first head over the first disk surface.

18. The method as recited in claim 17, further comprising the step of generating a shock detect signal representing a physical shock to the disk drive in response to the servo data read from the second track through the second head.

19. The method as recited in claim 18, further comprising the step of generating the shock detect signal in response to the servo data read from the first track through the first head.

20. The method as recited in claim 18, wherein the shock detect signal is generated in response to the high pass signal.

21. The method as recited in claim 19, wherein the shock detect signal is generated in response to the high pass signal.

22. The method as recited in claim 18, wherein:
(a) wherein the step of accessing the first track comprises the step of writing data to the first track during a write operation; and
(b) further comprising the step of aborting the write operation if the shock detect signal indicates a physical shock of sufficient magnitude has occurred.

23. The method as recited in claim 22, further comprising the step of aborting the write operation if the shock detect signal exceeds a predetermined threshold.

24. The method as recited in claim 22, wherein the write operation is aborted if the high-pass signal exceeds a predetermined threshold.

25. The method as recited in claim 19, wherein:
(a) the step of accessing the first track comprises the step of writing data to the first track during a write operation; and
(b) further comprising the step of aborting the write operation if the shock detect signal indicates a physical shock of sufficient magnitude has occurred.

26. The method as recited in claim 25, further comprising the step of aborting the write operation if the shock detect signal exceeds a predetermined threshold.

27. The method as recited in claim 25, wherein the write operation is aborted if the high-pass signal exceeds a predetermined threshold.

28. The method as recited in claim 17, further comprising the step of controlling the position of the first head with respect to the first track in response to the servo data read from the first and second tracks.

29. The method as recited in claim 17, further comprising the steps of:
(a) using a first microactuator to actuate the first head radially over the first disk surface in fine movements in response to the servo data read from the first track; and
(b) using a second microactuator to actuate the second head radially over the second disk surface in fine movements independent of the first microactuator in response to the servo data read from the second track.

30. The method as recited in claim 29, further comprising the step of controlling the voice coil motor in response to the servo data read from the first track.

31. The method as recited in claim 29, further comprising the step of controlling the voice coil motor in response to the servo data read from the first and second tracks.

32. The method as recited in claim 17, further comprising the steps of
using a microactuator to actuate the first head radially over the first disk surface and the second head radially over the second disk surface in fine movements in response to the servo data read from the first and second tracks.

* * * * *